No. 706,106. Patented Aug. 5, 1902.
W. B. POTTER.
ELECTRIC RAILWAY.
(Application filed Nov. 18, 1896.)
(No Model.)
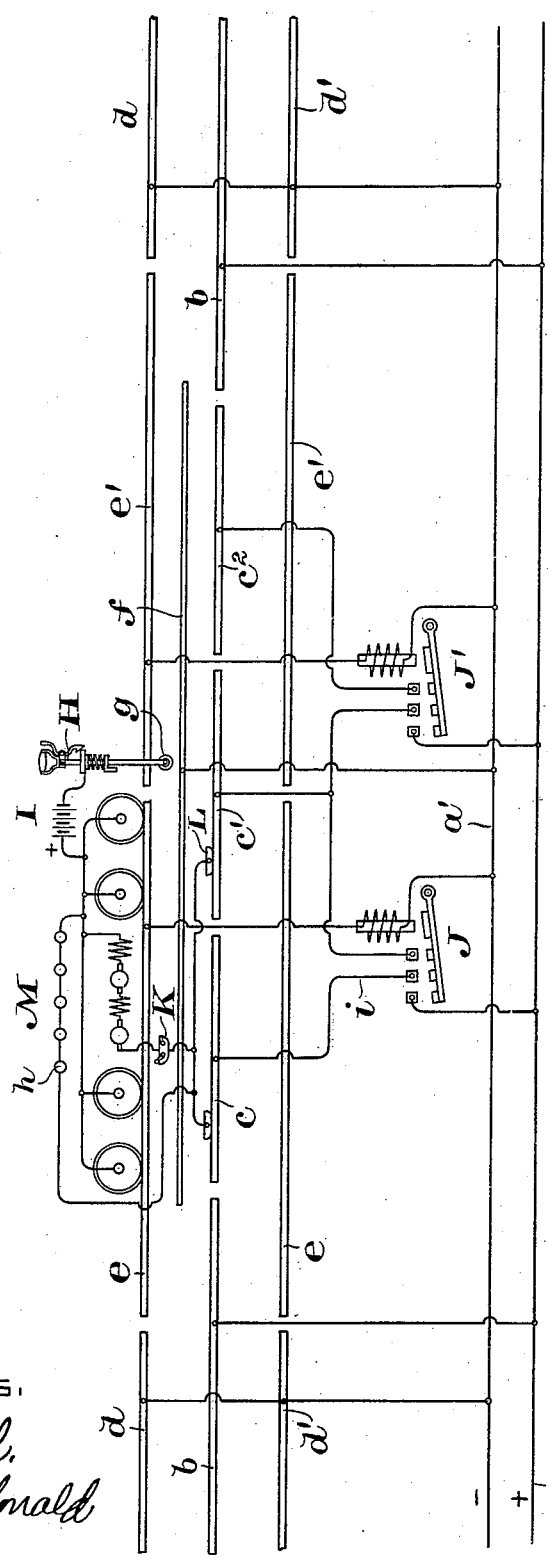
WITNESSES.
A. H. Abell.
A. F. Macdonald.
INVENTOR.
William B. Potter,
by Geo. R. Blodgett,
Atty.

UNITED STATES PATENT OFFICE.

WILLIAM B. POTTER, OF SCHENECTADY, NEW YORK, ASSIGNOR TO THE GENERAL ELECTRIC COMPANY, A CORPORATION OF NEW YORK.

ELECTRIC RAILWAY.

SPECIFICATION forming part of Letters Patent No. 706,106, dated August 5, 1902.

Application filed November 18, 1896. Serial No. 612,648. (No model.)

*To all whom it may concern:*

Be it known that I, WILLIAM B. POTTER, a citizen of the United States, residing at Schenectady, in the county of Schenectady, State of New York, have invented certain new and useful Improvements in Electric Railways, (Case No. 463,) of which the following is a specification.

The present invention relates to electric railways of the class commonly known as "third-rail" systems.

The invention has for one of its objects to provide a third-rail system in which the continuity of the third rail or supply-conductor is interrupted at stations, crossings, or other predetermined points and sectional conductors substituted therefor which are normally disconnected from the source of supply, thus preventing persons from receiving shocks, and to provide means for rendering the sections active when a train approaches a certain point.

The invention also has for its object to further insulate the system by interrupting the electrical continuity of the traffic-rails by insulating single rails or groups of rails from each other, utilizing the rails thus disconnected as a part of the circuit-closing means.

The invention further provides means carried by the moving train for closing the switches between the source of supply and the sectional conductors if for any reason the circuit between a power-section engaged by the car-collector and the source is interrupted.

The invention further has for its object to maintain the circuit of the lamps on the train moving on a sectional railway after the train comes to a standstill or when the motors are cut out of circuit or in any case when the circuit between the power-section engaged by the car-collector and the source may be interrupted.

My invention is particularly adapted for roads on which trains are to be operated at high speeds, for the switch-energizing sections break joints with the sections of the power-conductor in such a manner that each electromagnetic connecting-switch is operated before the car-collector reaches the section to which the said switch is connected.

The accompanying drawing is a diagrammatic representation of the invention.

In the drawing attached to and made a part of this specification, *a* indicates the positive feeder, connected at intervals to the third rail or conductor *b*. The space between the ends of the rail *b* represents a station, crossing, or other point where it is desired to interrupt the continuity of the conductor. Between the ends of the conductor *b* are a number of sectional power-conductors *c c'*, &c., normally disconnected from the source of supply, but rendered active by an approaching train. The electrical continuity of the traffic-rails *d d'* is interrupted and switch-energizing sections *e e'*, composed of one or more rails, are substituted at the point of interruption, which break joint with the sections of the conductor-rail. The car-wheels therefore serve as traveling conductors or collectors, engaging with the rail-sections or road-contacts. Extending parallel with the tracks is a conductor *f*, approximately equal in length to the distance between the ends of the conductor *b* and connected to the negative or ground return in any suitable manner.

M is the motor car or vehicle, equipped with a motor or motors in any desired manner.

K is a controller carried by the vehicle and adapted to modify the circuit relations of the motor in any desired manner.

L is a collector supported by the moving vehicle, consisting of two contact-shoes electrically connected and adapted to make sliding contact with the third rail *b* or sectional conductors *c c'*, &c. The contact device H, mounted on the vehicle, is provided with a spring for normally holding it in the position shown. When it is desired to make contact with the conductor *f*, the contact or roller *g* is forced downward by means of the handle and locked in position by any suitable device. Electrically connected with the contact H is a storage battery I, having sufficient power to pick up the switches J J' when the proper connections are established. At *a'* is a negative or ground conductor, forming a connection between the ends of the traffic-rails *d d'* and may form a portion of the negative feeder if the system is provided with such. It is only necessary that a good circuit be maintained for the generator. The sections e e' are also connected to the negative feeder a'; but each connection includes the coil of an electromagnet on the switches J J'. The switches J and J' are commonly known as "three-point" switches on account of having three contact-points which establish two connections, the first between the source of supply a and the section c, the second between the source of supply a and the adjacent section c'. It is perfectly clear that this device permits sections to be energized in advance of the train or at least in advance of the collector carried thereby. The overlap of the sections e e' with respect to the sections c c', &c., increases the advantage obtained by the three-point switch without complicating the electrical connections. It is clear that as soon as the car-collector engages a section e both sections c c' will be enlivened in advance of the collector. The actuating-coils for each switch are included, respectively, between the sections e e' of the traffic-rails and the negative conductor a'.

The lighting-circuit is connected to the source of supply at a point between the collector L and the controller K, this being the usual arrangement employed in such systems. This, however, will only provide for lighting the train when energy is being supplied to the motors when the train is on a sectional portion of the road or when the train is on the portion of the road having the continuous third-rail construction. To overcome this objection, (the extinction of the lights being very undesirable, both on account of danger from approaching trains and the inconvenience to passengers,) means are provided for including the lights in circuit with the feeder or supply-conductor a and this without in any way causing the lamps to dim. The lighting-circuit is typical of a circuit for any other translating devices which should be capable of being operated at all times.

The operation of the system is as follows: The vehicle M, assuming it to move from left to right, would, so long as the collector L remained upon the conductor b, receive energy therefrom, which, by means of the controller K, is supplied to the motors in any desired amount. The lamp-circuit would also be complete. As the vehicle progresses the wheels run upon the insulated section e of the traffic-rails, and the coil on the switch J is energized by the current flowing from the motors through section e to the return or negative conductor a'. This action is repeated as the vehicle progresses and the lighting-circuit is intact. If the power is shut off by the controller K or other means, the switch J opens and section c is killed, as no current flows through the energizing-coil of the switch. Without other means the train is unable to start and the lighting-circuit is broken. The lighting-circuit remains intact from the conductor c to section e of the traffic-rail; but the current flowing therein is insufficient to hold the switch J closed. To prevent this, the contact device H is forced downward when the car or train is about to stop to a point where it would engage with the conductor f and locked in this position by any suitable means. A circuit will now be established by means of the battery I through the wheels of the vehicle M, section e of the traffic-rails, the coil on the switch J, to the negative conductor or ground a', to the conductor f, to the negative side of the battery I. By this means the switch J is held in the closed position even though no current is passing through the motors. The section c is thus maintained alive, although the motors are cut out at the controller K, the circuit being from feeder a, switch J, wire i, sectional conductor c, collector L, lamps h, sectional traffic-rail e by means of the wheels of the vehicle, energizing-coil of switch J, to negative feeder a'. The current from the battery being in the same direction as that through the lamps it may be left in circuit until it is automatically cut out by the contact device H moving off the conductor f. As soon as the vehicle starts and current is supplied to the motors the contact device may be released, the current flowing from the sections of the traffic-rails to the negative conductor holding the switches closed.

What I claim as new, and desire to secure by Letters Patent of the United States, is—

1. In an electric railway, the combination of a third-rail conductor the continuity of which is interrupted at stations or other predetermined points, sectional conductors at the points of interruption, traffic-rails divided electrically into sections at the points of interruption, and energizing-coils for circuit-closing switches permanently included in circuit between the traffic-rail sections and the negative conductor; the arrangement being such that the coils are energized by the main-line current after it has passed through the propelling motor or motors.

2. In an electric railway, the combination of a third-rail conductor the continuity of which is interrupted at stations or other predetermined points, sectional power-conductors substituted at the points of interruption, insulated sections of the traffic-rails also located at the points of interruption of the third rail or conductor forming energizing-conductors, switches for closing the circuit between the power-sections and the source of supply, and energizing-coils for the switches permanently included in circuit between the sectional traffic-rails and the negative conductor, the arrangement being such that the coils are energized by the main-line current after it has passed through the propelling motor or motors.

3. In an electric railway, the combination of a vehicle, a sectional power-conductor normally disconnected from the source of supply, a continuous conductor extending parallel with the sectional conductor but forming no part of the motor-circuit, a battery, electromagnetic switches for closing the circuit between the source of supply and the sectional conductor, and means for including the battery in circuit with said conductor and the energizing-coils of the switches for closing the circuit of the sectional conductor.

4. In an electric-railway system, the combination of a third rail or conductor for supplying current to the motors and lighting-circuit, the continuity of which is interrupted at certain points, a sectional conductor substituted at the point of interruption, a feeder and means for transferring the lighting-circuit from the third rail to the sectional conductor.

5. In an electric-railway system, the combination of a third rail or conductor for supplying current to the motors and lighting-circuit, the continuity of which is interrupted at certain points, a sectional conductor substituted at the point of interruption, a feeder, means for transferring the lighting-circuit from the continuous third rail to the sectional conductor, switches for including the sectional conductors in circuit with the feeder, and means for maintaining the circuit after the supply of current to the motors ceases.

6. In an electric railway, the combination of a third rail or conductor, the continuity of which is interrupted at certain points, a sectional conductor substituted therefor at the point of interruption, traffic-rails also divided into sections at the point of interruption of the third rail, and a conductor permanently grounded extending parallel with the sectional conductor, and approximately equal in length to the space between the ends of the third rail.

7. In an electric railway, the combination with the positive and negative main wires or cables, of power-conductor sections, electromagnetically-operated switches for connecting the latter with the positive main, insulated track-sections, connections including switch-operating coils between the track-sections and the negative main, whereby the switches are operated by current flowing from the motors, an independent or auxiliary source of current carried by the car and adapted to be connected with the track-rails, and an auxiliary road-conductor connected to the negative main, and over which conductor a circuit is established to initially energize a switch-magnet.

8. In an electric railway, the combination with the feeder, of a power-conductor permanently connected therewith but interrupted at desirable locations, power-conductor sections between the adjacent ends of the interrupted conductor and normally disconnected from the feeder, collecting means on the car, electromagnetic switches adapted to connect said sections with the feeder as the car is driven forward, and a device on the car adapted to be operated manually to close said switches when insufficient current is flowing through the collecting means, said device being automatically rendered inoperative as the car proceeds.

9. In an electric railway, the combination with the feeder, of a sectional power-conductor, a collector carried by the car, car-motors, connected with the collector, a controller for the motors, translating devices in parallel with the motors, electromagnetic switches for connecting the power-conductor sections with the feeder while sufficient current is flowing through the collector, but tending to open when the current falls off, and an auxiliary means for maintaining said switches closed when the current flowing through the collector is insufficient.

10. In an electric railway, the combination with the feeder, of a power-conductor permanently connected with the feeder, and interrupted for a considerable space at locations where it is undesirable to have the power-conductor continuously alive, power-conductor sections in such space and normally disconnected from the feeder, a collector, electromagnetic switches adapted to be closed to connect said sections with the feeder while sufficient current is flowing through the collector, but tending to open when such current falls off, and auxiliary means for closing said switches when the current flowing through the collector is insufficient.

11. In an electric railway, the combination with the feeder, power-conductor sections, electromagnetically-operated switches for connecting the latter with the former, energizing-conductor sections connected with the magnet-coils of the switches, a traveling collector on the car for collecting current for the motors from the power-conductor section, traveling conductors on the car connected with the motors and engaging the energizing-sections, and an auxiliary traveling contact carried by the car for operating the switches when current is cut off from the car-motors.

12. In an electric railway, the combination with the feeder, of auxiliary conductor-sections, a collector carried by the car for engaging said conductor-sections, electromagnetic switches adapted to be closed by current flowing through the collector to connect the power-conductor sections with the feeder as the car progresses, a road-conductor independent of said conductor-sections, which is connected with the coils of said switches, a source of electricity on the car, and a contact device connected with said source and adapted to engage said road-conductor to energize said switches when they open owing to a lack of current flowing through the collector.

13. In an electric railway, the combination with the positive and negative mains, of conductor-sections, electromagnetic switches for connecting the latter with the former, the switch-coils being connected between the negative main and conductor-sections, an independent or auxiliary source of current adapted to be connected with a conductor-section, and an auxiliary road-conductor independent of said conductor-sections, which is connected to the negative main, whereby when the auxiliary source is connected also with the auxiliary conductor, a circuit will be established through a switch-magnet.

14. In an electric railway, the combination with the feeder, of a sectional power-conductor, electromagnetic switches for connecting the sections of the latter with the former, an auxiliary or pick-up sectional conductor arranged parallel to the sectional power-conductor, each section of said auxiliary conductor being connected to but one switch-magnet coil, and collectors carried by the car, the relative arrangement of the sectional conductors and collectors being such that a section of the auxiliary conductor is engaged by a collector, in either direction of movement of the car, before the power-section, which is thereby energized, is engaged by its collector.

15. In an electric railway, the combination with the feeder, of a sectional power-conductor, electromagnetic switches connecting the former with the latter, a sectional auxiliary or pick-up conductor arranged parallel to the power-conductor, each section of the auxiliary conductor being connected with but one switch-magnet coil, and the sections of the power and auxiliary conductor overlapping with respect to each other, whereby each power-conductor section is connected to the feeder in advance of the collector.

16. In an electric railway, the combination with the feeder, of a sectional power-conductor, electromagnetic switches for connecting the sections of the latter with the former, an auxiliary or pick-up conductor located parallel to the sectional power-conductor, a section of the auxiliary power-conductor being connected to the magnet-coils of the switch, a switch being connected to two power-sections, a power-section being connected to two switches; and collectors carried by the car, the relative arrangement of the power and auxiliary sections and the collectors being such that a switch is closed to enliven two power-sections before the collector has engaged with either of such power-sections.

In witness whereof I have hereunto set my hand this 30th day of October, 1896.

WILLIAM B. POTTER.

Witnesses:
B. B. HULL,
C. L. HAYNES.